March 10, 1936. W. J. CALDWELL 2,033,815
MEAT HOLDER AND SLICER
Filed June 4, 1934  2 Sheets-Sheet 1
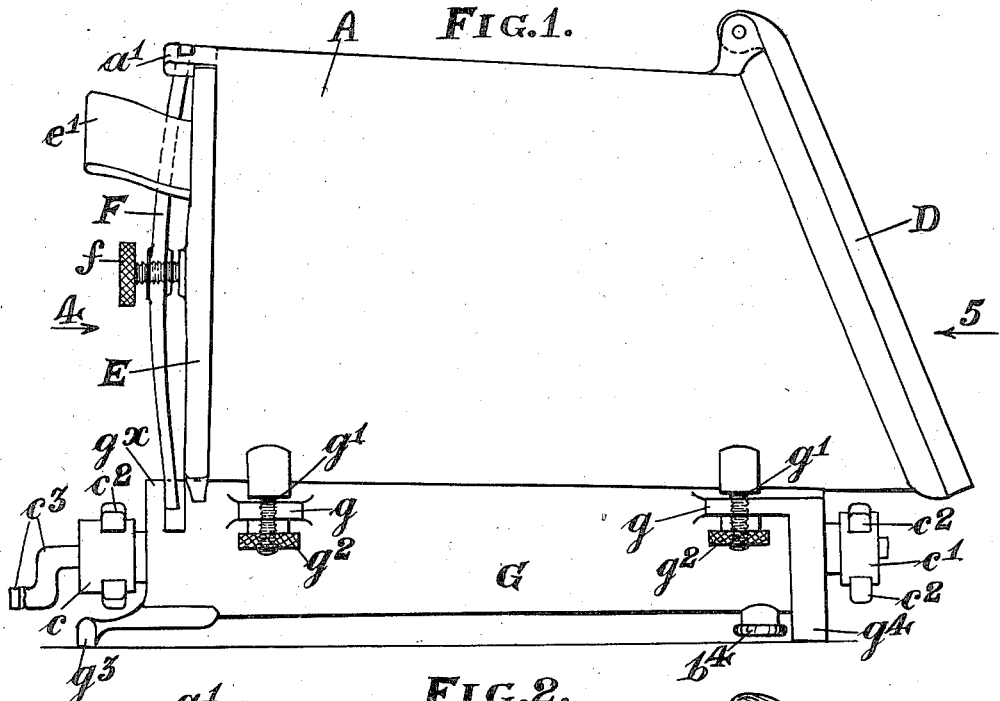
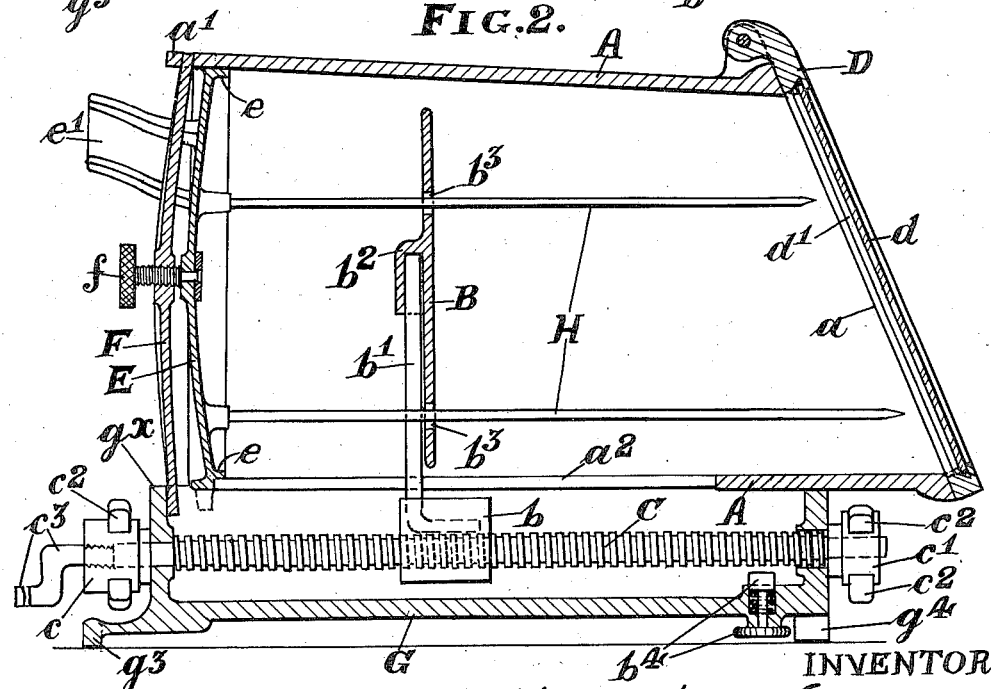
INVENTOR
WILLIAM JAMES CALDWELL
By Eugene E. Stevens
ATTORNEY

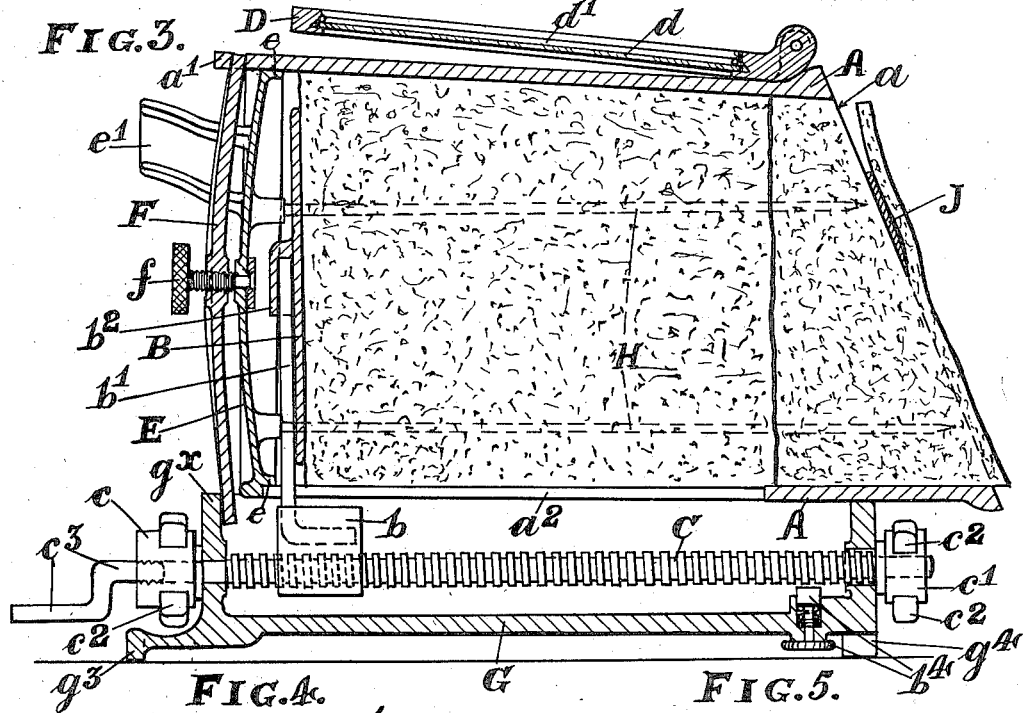
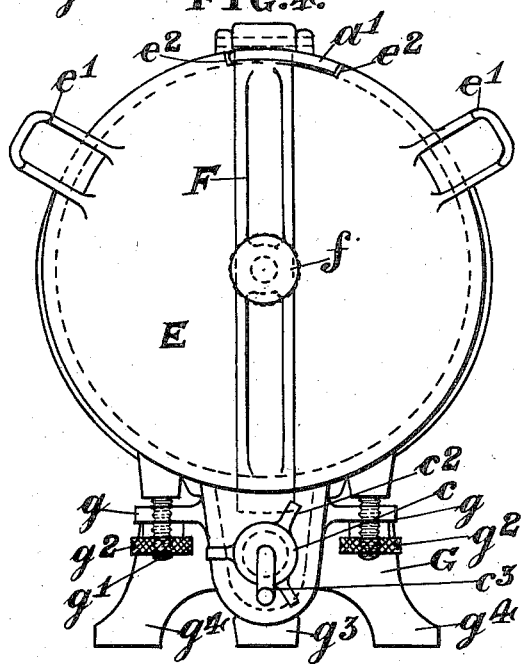
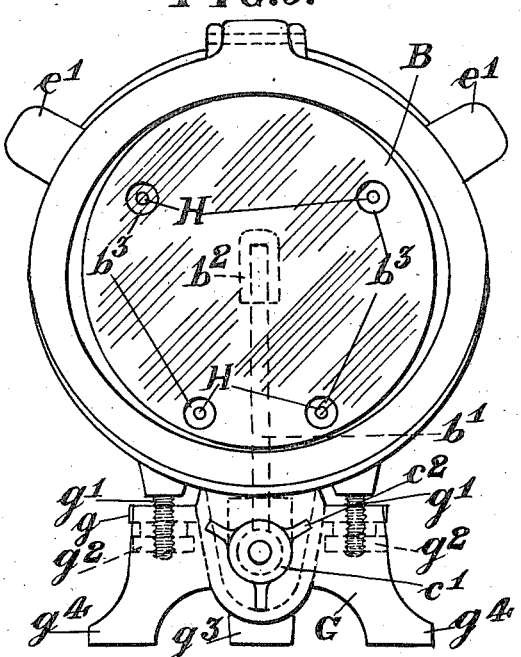

Patented Mar. 10, 1936

2,033,815

UNITED STATES PATENT OFFICE 2,033,815

MEAT HOLDER AND SLICER

William James Caldwell, Brierfield, England

Application June 4, 1934, Serial No. 728,971
In Great Britain March 24, 1933

1 Claim. (Cl. 146—150)

This invention relates to an appliance for facilitating the slicing of meat and other food-stuffs and to that type of appliance which comprises a tubular container fitted with a disc, or pusher plate actuated by a screw situated outside the container, and has for its object to introduce an improved construction of appliance of this type.

According to this invention the delivery end of the tubular container is made smaller than the feed end so that the foodstuff is gripped tightly at the point where it is subjected to the slicing operation and the delivery end of the container is inclined or slanting so that the foodstuff can be cut right to the end and so eliminate waste by inserting another quantity of foodstuff to push the remaining portion forward and enable the slicing operation to be continued from the rear portion of one quantity to the front portion of the next.

In the accompanying drawings:—

Fig. 1 is an elevation, and Fig. 2 a section of an appliance for holding meat and other foodstuffs for slicing.

Fig. 3 is a section of the appliance showing a nearly finished portion of meat followed by an uncut portion.

Fig. 4 is an end view, and

Fig. 5 a front view of the appliance.

A indicates the tubular container, B the disc or pusher plate and C the screw. The tubular container A is made conical with its front end smaller than the rear end. The front end of the container is inclined or slanting as shown at $a$ and hinged to the top of the front end of the container is a lid D that is fitted with a glass front $d$ that is conveniently secured in position by a retaining ring $d^1$. The adjacent faces of the front end of the container $a$ and the lid D are machined or otherwise constructed to make a tight joint when the lid is closed. The rear end of the container is closed by a cover plate E that is formed with a flange $e$ to fit the bore of the container A and make a tight joint with it. The cover plate E is clamped tightly against the end of the container A by means of a cross bar F that engages a slotted lug $a^1$ projecting from the rear end of the container A and an end portion $g^x$ of a casing G that contains the screw C. The cross bar F is formed with a tapped hole in the centre for the passage of a screw $f$ that is rotatably mounted in the end of the cover plate E. When the cross bar F has been turned into engagement with the slotted lugs and the screw $f$ tightened, the cover plate E becomes firmly clamped against the rear end of the container A. Detachably secured to the underside of the container A is a casing G that is formed with lugs $g$ for the passage of studs $g^1$ which are fixed in bosses on the container A and fitted with nuts $g^2$ for clamping the casing to the container. Rotatably mounted in the latter is a screw C for traversing the pusher plate B. For this purpose the screw C is fitted with a nut $b$ from which projects an arm $b^1$ that passes through a slot $a^2$ in the container A and enters a lug $b^2$ on the pusher plate B. The screw C is rotatably mounted in bearings in the casing G, and is fitted at its ends with two turning devices $c$, $c^1$. Each of these turning devices is formed with projecting wings $c^2$ by means of which a partial turn can be given to the screw C by the finger or thumb until the latter comes to rest against a stationary part of the machine or against the table or stand on which the machine is mounted. The turning device $c$ is also formed with an axial hole that is tapped to receive a crank handle $c^3$ by means of which the screw C can be rotated quickly and continuously for traversing the pusher plate B back to the rear end of the machine after it has completed its forward traverse. The casing G is formed with legs $g^3$, $g^4$ for supporting the machine in a horizontal position. The leg $g^3$ is continued rearwardly as shown in Figs. 1, 2 and 3 to co-operate with legs $e^1$ on the cover plate E for supporting the machine in a vertical position. Projecting inwardly from the cover plate E are a number of pointed skewers H which pass through the meat almost to the front end of the container and hold it securely during the cutting operation. Any turning of the cover plate E relatively to the container A is prevented by the slotted lug $a^1$ passing through a gap $e^2$, Fig. 4, in the cover plate E. $b^4$ indicates a movable stop which when engaged by the nuts $b$ acts as a warning to show that the container is nearly empty. When disengaged from the nut, the pusher plate can be advanced until the arm $b^1$ comes against the end of the slot $a^2$. The foodstuff is introduced into the container from the rear end and for this purpose the cover plate E with the skewers H are removed so that the pusher plate B can be retracted beyond the open end and turned on its traversing screw to one side and removed. The foodstuff is then inserted into the container and pushed towards the front end. The pusher plate B is assembled on the arm $b^1$ and moved to an upright position so that such arm will enter the slot $a^2$ when the screw C is turned to move the pusher plate up against the foodstuff. The cover plate E with its skewers H is now brought into use and the ends of the skewers passed through guide holes $b^3$ formed in the pusher plate B and are pushed through the foodstuff until the cover plate comes up against the end of the container. The clamping bar F is then turned to engage the parts $a^1$ and $g^x$ and the screw $f$ turned to tighten the cover plate against the end of the container. The foodstuff can now be fed to and through the open end of the container by imparting an intermittent turning motion to the screw C and sliced by a knife J, Fig. 3 either with the machine occupying a horizontal position as shown, or an upright position, the knife being guided by the sloping end $a$ of the container. The screw C is preferably made of a quick pitch and the amount of its rotation at each feed can be limited to any predetermined extent to regulate the thickness of the slices cut off according to requirements and according to the nature of the material that is being sliced.

When the foodstuff has been advanced by the pusher plate as far as possible beyond the stop $b^4$, the pusher plate together with the cover plate are removed in the manner previously described, another quantity inserted and pushed up against the portion that remains in the container. The pushed plate and cover plate are then assembled in the manner previously described and the screw turned to feed the remaining and additional portions forward so that the slicing operation can be continued from the rear portion of one quantity to the front portion of the next without waste.

In making the delivery end of the container smaller than the feed end the container may taper wholly or partially throughout its length or the feed end may be contracted. The container which may be circular or otherwise shaped in cross section is preferably constructed from stainless material. The glass or other cover at its sloping end can act in the capacity of a plate to receive the slices.

What I claim as my invention and desire to secure by Letters Patent in the United States is:—

In apparatus for slicing meat, a container having a conical bore converging towards its delivery end, the said delivery end being arranged obliquely to the axis of the container, a pusher plate slidably mounted in the container, a detachable cover plate situated at the rear end of the container, skewers mounted in said cover plate and adapted to pass through holes in the pusher plate and terminate at substantially equal distances from the inclined forward end of the container, and means for traversing the pusher plate along the skewers.

WILLIAM JAMES CALDWELL.